US006260275B1

United States Patent
Good

(10) Patent No.: US 6,260,275 B1
(45) Date of Patent: Jul. 17, 2001

(54) ADJUSTABLE AEROSOL CAN HOLDER ATTACHMENT

(76) Inventor: Roger F. Good, P.O. Box 2222, Boerne, TX (US) 78006

( * ) Notice: Subject to any disclaimer, the term of this patent is extended or adjusted under 35 U.S.C. 154(b) by 0 days.

(21) Appl. No.: 09/507,056

(22) Filed: Feb. 29, 2000

(51) Int. Cl.⁷ .................................................. B27B 21/00
(52) U.S. Cl. .................................... 30/123.3; 30/123
(58) Field of Search .................. 30/123, 123.3, 30/249–251

(56) References Cited

U.S. PATENT DOCUMENTS 3,949,440 * 4/1976 Guerra ............................... 30/123.3

* cited by examiner

Primary Examiner—Douglas D. Watts
(74) Attorney, Agent, or Firm—John D. Gugliotta; Michael J. Corrigan

(57) ABSTRACT

The invention is an adjustable aerosol can holder attachment kit for a conventional tree pruner. The addition of the device to a conventional tree pruner gives the user the ability to hold and operate an aerosol can of spray paint at the end of the tree pruner. After the user saws off a tree branch using the saw on the end of the pole, a rope attached to the branch cutting lever arm is pulled. This in turn depresses the nozzle on the spray can, which is attached to the conventional tree pruner. When the rope is pulled and the nozzle depressed, the spray can sprays its contents in the area designated by the user. The attachment kit consists of a receiving sleeve for holding the aerosol spray can and a wedge-shaped plate which attaches to the conventional tree pruner.

4 Claims, 3 Drawing Sheets

ADJUSTABLE AEROSOL CAN HOLDER ATTACHMENT

RELATED APPLICATIONS

The present invention was first described in Disclosure Document Number 459,003 filed on Jun. 24, 1999. There are no previously filed, nor currently any co-pending applications, anywhere in the world.

BACKGROUND OF THE INVENTION

1. Field of the Invention

The present invention relates generally to extendible tree-pruning devices and, more particularly, to an adjustable aerosol can holder attachment for attachment to a conventional tree pruner.

2. Description of the Related Art

Within the related art, numerous patents exist for tree-pruning pole devices, and power saw pruning devices. These include U.S. Pat. No. 5,241,752 issued in the name of Lutzke et al., U.S. Pat. No. 5,084,975 issued in the name of Melter, U.S. Pat. No. 4,096,630 issued in the name of Honick, U.S. Pat. No. 4,033,036 issued in the name of Morris, and U.S. Pat. No. 3,835,535 issued in the name of Robinson et al.

U.S. Pat. No. 5,787,536 issued in the name of Pate describes a remote saw system comprising a radio transmitter, receiver, and a servomechanism.

U.S. Pat. No. 5,756,542 issued in the name of Kojima et al. discloses an ointment-like preparation of a tree and removal of parts of the tree.

U.S. Pat. No. 5,143,131 issued in the name of Seigneur describes a selectable fluid spraying chain saw bar system.

U.S. Pat. No. 4,566,188 issued in the name of Wilson discloses a power saw pruning device including an elongated pole handle.

U.S. Pat. No. 3,949,440 issued in the name of Guerra describes a combined tree saw, pruner, and paint sprayer. However, the Guerra invention has the paint sprayer holder and spray mechanism integrally built into the tree pruner and has no application to existing tree pruners. Accordingly, there is a need for an aftermarket aerosol sealant attachment kit for a conventional tree pruner.

While tree-pruning devices are incorporated into this invention in combination, other elements are different enough as to make the combination distinguished over the related art.

SUMMARY OF THE INVENTION

It is therefore an object of the present invention to provide an improved aftermarket aerosol attachment kit for conventional tree pruners.

It is a feature of the present invention to seal pruned ends of trees against bug infestation and rot without the use of a ladder.

It is another feature of the present invention to provide an actuation lever which attaches to a lever arm and is easily actuated by a pull rope.

Briefly described according to the preferred embodiment of the present invention, an adjustable aerosol can holder attachment for a tree pruner is disclosed comprising a receiving sleeve demountably and adjacently positioned midway along the lateral external surface of a cutting head of a conventional tree pruner. The receiving sleeve is made from a shear resistant fabric material of high-tensile strength formed into an elongated cylindrical configuration wherein an upper and lower buckle clamp are attached to its outer surface for securing an aerosol can within the interior of the receiving sleeve. The upper and lower buckle clamp adjustably accommodate aerosol sealants of various sizes. A wedge-shaped plate having a slot formed in its front edge clamps to the cutting head of the tree pruner. An L-shaped actuation lever is pivotally connected to the outer surface of the wedge-shaped plate via a pivot pin for depressing a plunger which presses the spray head of the aerosol can whenever the lever arm of the tree pruner is pulled down via a rope and pulley system on the tree pruner.

An advantage of the present invention is that it can be easily attached to a conventional tree pruner.

Another advantage of the present invention is that it alleviates the need for ladders and can be used at any angle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

10 Adjustable Aerosol Can Holder Attachment
15 Receiving Sleeve
20 Cutting Head
25 Conventional Tree Pruner
30 Lever Arm
40 Rope and Pulley System
45 Upper Pulley
50 Lower Pulley
55 Pruning Saw
60 Upper Buckle Clamp
65 Lower Buckle Clamp 70 Body
80 Depressable Nipple
110 Wedge Shaped Plate
115 First Slot
120 Second Slot
130 Thumb Screw
140 Aerosol Sealant
145 Actuation Lever
150 Plunger
160 First Pivot Pin
166 Second Pivot Pin
170 Guide Hoop
175 Spring
180 Flexible Rope

DESCRIPTION OF THE PREFERRED EMBODIMENTS

Figure 1:
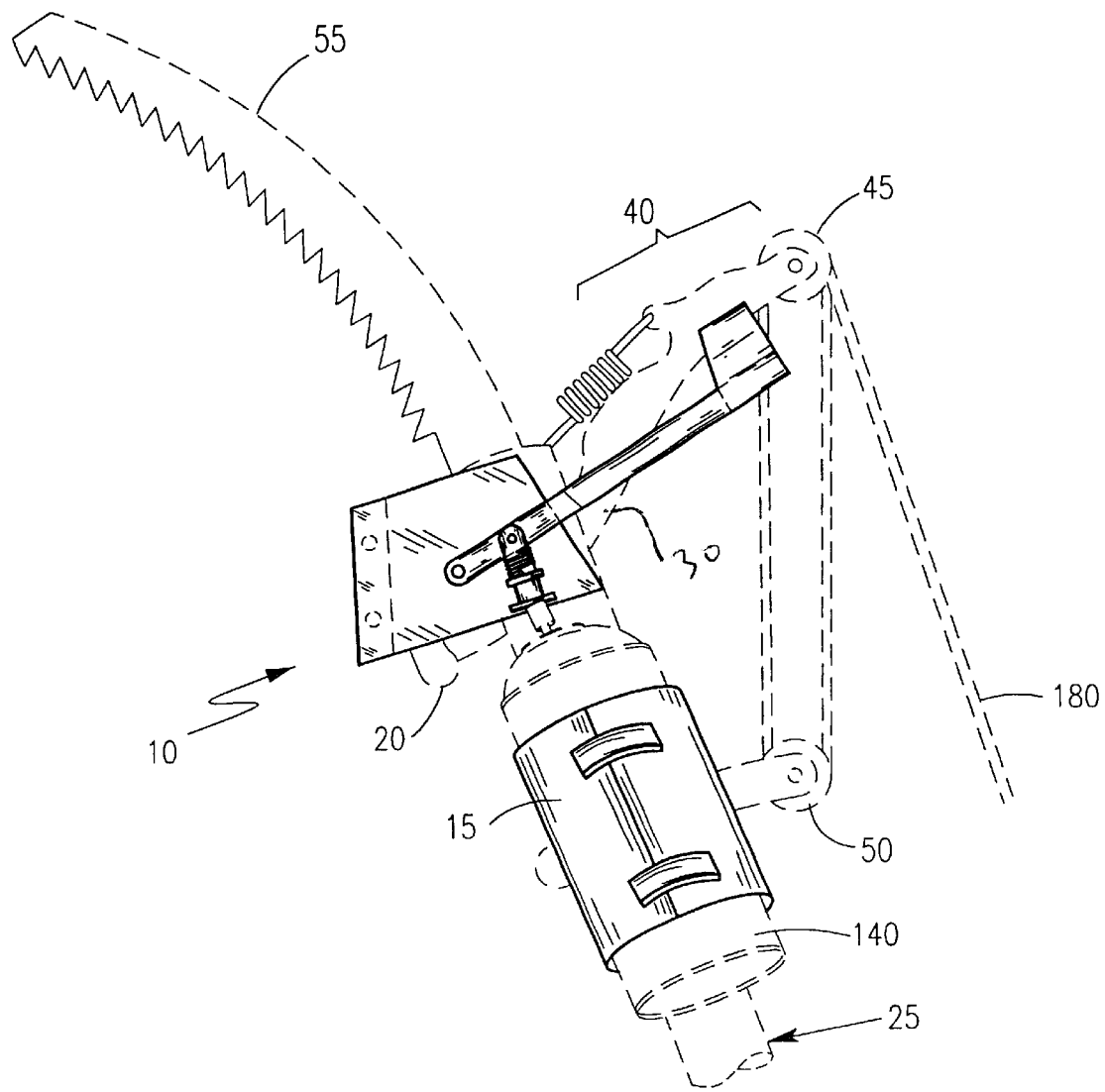
FIG. 1 is a perspective view of an Adjustable Aerosol Can Holder Attachment installed on a conventional tree pruner, according to the preferred embodiment of the present invention.
Figure 2:
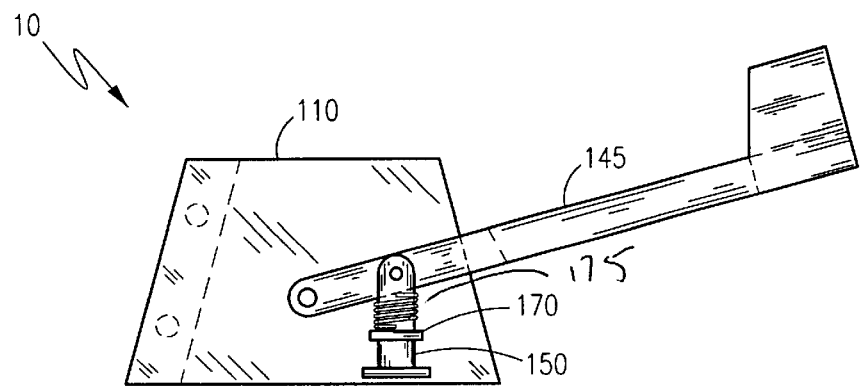
FIG. 2 is a front view of the wedge shaped plate and actuation lever from an Adjustable Aerosol Can Holder Attachment, according to the preferred embodiment of the present invention.
Figure 3:
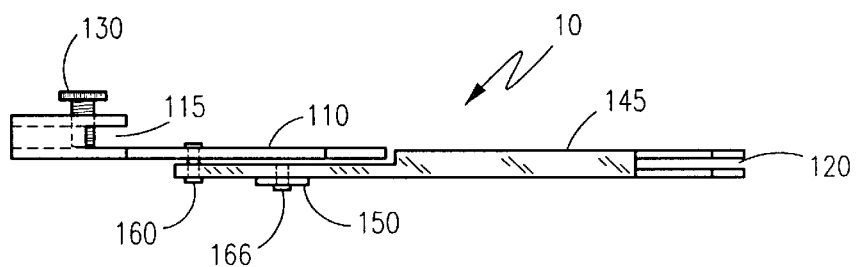
FIG. 3 is a top view of the wedge shaped plate and actuation lever from an Adjustable Aerosol Can Holder Attachment, according to the preferred embodiment of the present invention.
Figure 4:
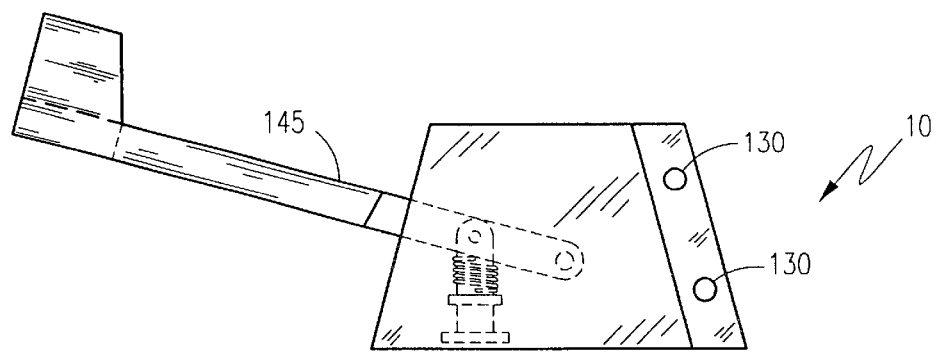
FIG. 4 is a rear view of the wedge shaped plate and actuation lever from an Adjustable Aerosol Can Holder Attachment, according to the preferred embodiment of the present invention.
Figure 5:
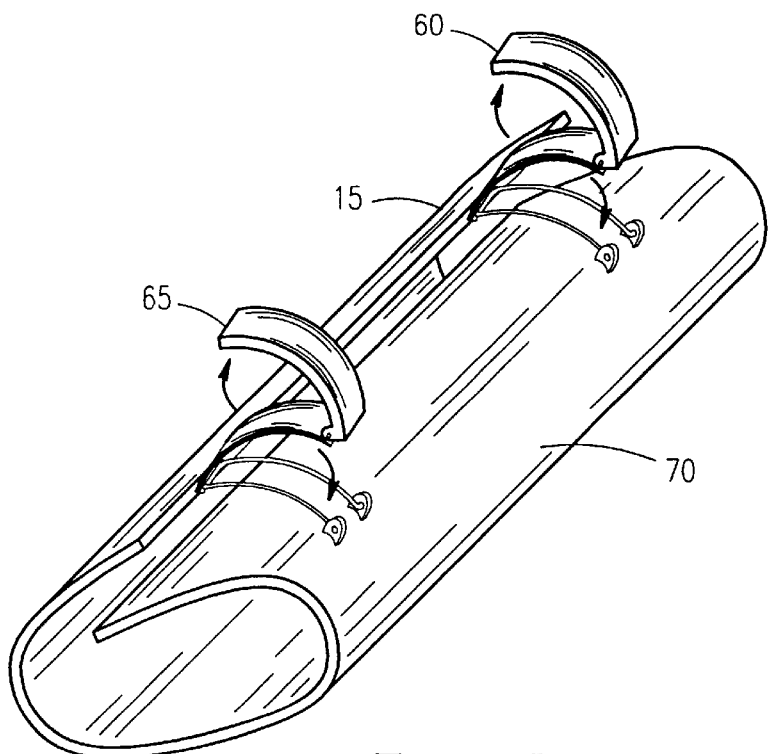
FIG. 5 is a front perspective view of the receiving sleeve from an Adjustable Aerosol Can Holder Attachment installed on the cutting head of a conventional tree pruner and holding an aerosol spray can within the interior of the receiving sleeve, according to the preferred embodiment of the present invention.
Figure 6:
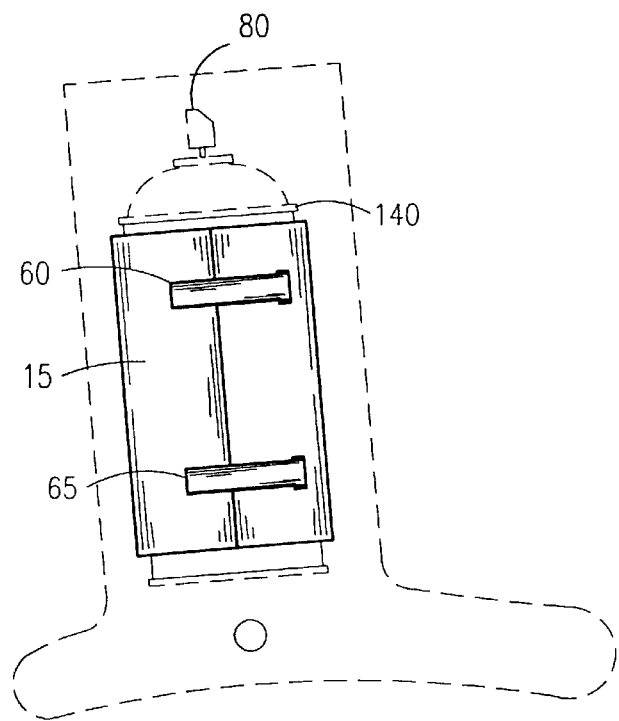
FIG. 6 is a front perspective view of the receiving sleeve from an Adjustable Aerosol Can Holder Attachment installed showing the detail of the operation of the upper and lower buckle clamp and how an aerosol can of various sizes may be inserted releasably held within the interior of the receiving sleeve, according to the preferred embodiment of the present invention.

The best mode for carrying out the invention is presented in terms of its preferred embodiment, herein depicted within the FIGS. 1–6.

1. Detailed Description of the Figures

Referring to FIGS. 1 through 6, an Adjustable Aerosol Can Holder Attachment 10 for a conventional tree pruner 25 is disclosed, comprised of a receiving sleeve 15 attached to the adjacent lateral external surface of a cutting head 20 of a conventional tree pruner 25 for receiving a can of aerosol sealant (not part of disclosure) for sealing tree limbs after trimming and pruning. Typically, a conventional tree pruner 25 is comprised of a lever arm 30 pivotally connected to a cutting head 20, an elongated pole handle 35, and a rope and pulley system 40 for operating a pruning saw 55. However, after cutting a limb, one may desire to spray the exposed portion of the tree with a tar like mixture to prevent that portion of the tree from rotting. This often proves difficult due the height where the pruning was done. To simplify this process, the present invention allows the attachment of a can of tree limb tar to be attached to the end of the tree pruner. Besides the receiving sleeve heretofore described, an actuating means is disclosed for selectively depressing the spray head of the aerosol can. The actuating means is designed to work in cooperation with the existing lever arm of a tree pruner by a user pulling on the rope from the rope and pulley system described further hereinbelow.

The positioning of the receiving sleeve 15 avoids interference with the rope and pulley system 40 of the conventional tree pruner 25. The body 70 of receiving sleeve 15 is made from a shear resistant fabric of high tensile strength formed into an elongated cylindrical configuration for receiving an aerosol can containing sealant of varying size within its interior volume. Receiving sleeve 15 is comprised of an upper buckle clamp 60 and a lower buckle clamp 65 permanently attached to the exterior surface of body 70. The upper buckle clamp 60 and lower buckle clamp 65 adjustably accommodate aerosol sealants 140 of various sizes and secure the aerosol sealant 140 in place before use. The aerosol sealant 140 is typically of the type having a depressable nipple 80 for ejecting propellant. Both the upper buckle clamp 60 and lower buckle clamp 65 are attached to the receiving sleeve 15 by a method such as sewing. When upper buckle clamp 60 and lower buckle clamp 65 are closed, the diameter of receiving sleeve 15 is contracted and the aerosol sealant within its interior volume is firmly gripped until upper buckle clamp 60 and lower buckle clamp 65 are released.

The actuating means for depressing the spray head of the aerosol can is comprised of a wedge-shaped plate 110 having a U-shaped first slot 115 formed in its front edge. Wedge-shaped plate 110 is attached to the front surface of cutting head 20 by clamping first slot 115 over the front edge of cutting head 20. A pair of thumb screws 130 are used to hold wedge-shaped plate 110 firmly to cutting head 20 via a pair of threaded apertures formed in the rear channel portion of the first slot 115 portion of wedge-shaped plate 110. The pair of thumb screws 130 can be tightened with a clockwise turn by one's hand, thereby temporarily fastening the wedge-shaped plate 110 and the cutting head 20 together.

Located on the front surface of wedge-shaped plate 110 is a linearly elongated vertically extending L-shaped actuation lever 145 having a second slot 120 located at one end. The opposite end is pivotally connected to the front surface of the wedge-shaped plate 110 via a pivot pin 160. The L-shaped design of the actuation lever 145 not only allows the actuation lever 145 to be pivotally connected to the front surface of the wedge-shaped plate 110, the L-shaped design also allows the actuation lever 145 to be horizontally aligned with the rear surface of the wedge-shaped plate 110 and avoids interference with the rope and pulley system 40 of the conventional tree pruner 25. In this fashion, second slot 120 is then also horizontally aligned with lever arm 30 which is pivotally connected to the rear surface of cutting head 20 and can receive lever arm 30 on its underside in a semi-interference type fit. When lever arm 30 is pulled downward and actuated via rope and pulley system 40, actuation lever 145 is forced downward by lever arm 30 and follows lever arm 30 in a parallel type manner.

Connected just behind pivot pin 160 is plunger 150. Plunger 150 is of a linearly elongated vertically extending cylindrical configuration having a first end and a second end. Plunger 150 is pivotally connected via a pivot pin 166 at the first end to actuation lever 145 at such an angle to allow the second end of plunger 150 to come into mechanical communication with the depressable nipple 80 of the aerosol sealant 140. The second end of plunger 150 is specially formed to have a wide flat surface to provide a solid surface for engaging depressable nipple 80. Plunger 150 is guided in the proper alignment to depressable nipple 80 by a guide hoop attached to the outer surface of wedge-shaped plate 110. Plunger 150 is encased by a spring 175 biasing spring 175 upward against actuation lever 145 so that plunger 150 is normally not applying pressure to depressable nipple 80 of aerosol sealant 145. The means for actuating depressable nipple 80 and attaching wedge-shaped plate 110 to cutting head 20 are meant only as suggestions and are not meant to be limiting.

2. Operation of the Preferred Embodiment

To actuate the aerosol sealant and thus seal the pruned ends of trees against bug infestation and rot, a user simply pulls on a rope from a rope and pulley system located on conventional tree pruner. The rope and pulley system is comprised of an upper pulley and a lower pulley which cooperate with a flexible rope. The upper pulley is attached to the top end of the lever arm while the lower pulley is attached to the bottom internal surface of the cutting head.

The flexible rope passes over the upper pulley and the lower pulley. Pulling downward on the flexible rope actuates the lever arm of the tree pruner in a downward direction, in turn causing the lever arm to come into mechanical communication with a slot formed on the end of the actuation lever of the device. As the slotted end of the actuation lever is pulled in a downward direction by the lever arm of the tree pruner, a plunger on the device is also depressed in a downward direction. This causes the other end of the plunger to come into mechanical communication with the depressable nipple of the aerosol sealant also forcing it downward causing a jet of propellant to be ejected in the direction of user's choice.

The foregoing description is included to illustrate the operation of the preferred embodiment and is not meant to limit the scope of the invention. The scope of the invention is to be limited only by the following claims.

What is claimed is:

1. In a tree pruner having a lever arm pivotally connected to a cutting head, an elongated pole handle, and a rope and pulley system for operating a pruning saw pivotally connected to the cutting head, an improvement comprised of an adjustable aerosol can holder and aerosol can trigger attachment, said improvement comprised of:

a receiving sleeve, said receiving sleeve attached to the adjacent lateral external surface of said cutting head of said tree pruner for receiving a can of aerosol sealant for sealing tree limbs after trimming and pruning; wherein said receiving sleeve is comprised of:

a body, said body made from a shear resistant fabric of high tensile strength formed into an elongated cylindrical configuration for receiving an aerosol can containing sealant of varying size within its interior volume;

an upper buckle clamp, said upper buckle clamp permanently attached to an exterior surface of said body;

a lower buckle clamp, said lower buckle clamp permanently attached to said exterior surface of said body; and wherein said upper buckle clamp and said lower buckle clamp are attached to said receiving sleeve by sewing, and when said upper buckle clamp and said lower buckle clamp are closed, the diameter of said receiving sleeve is contracted and the aerosol sealant within its interior volume is firmly gripped until said upper buckle clamp and said lower buckle clamp are released; and an actuating means, said actuating means for depressing the spray head of the aerosol can and being actuated by said lever arm by a user pulling on a rope from said rope and pulley system.

2. The improvement for a tree pruner of claim 1, wherein said actuating means for depressing the spray head of the aerosol can is comprised of:

a wedge-shaped plate, said wedge shaped plate having a U-shaped first slot formed in a front edge;

a pair of thumb screws, said pair of thumb screws being used to hold said wedge-shaped plate firmly to said cutting head via a pair of threaded apertures formed in a rear channel portion of said first slot of said wedge-shaped plate; and wherein said wedge-shaped plate is attached to a front surface of said cutting head by clamping said first slot over a front edge of said cutting head, and said pair of thumb screws tightened with a clockwise turn by one's hand, thereby temporarily fastening the wedge-shaped plate and the cutting head together.

3. The improvement for a tree pruner of claim 2, wherein said actuation means is further comprised of:

a linearly elongated vertically extending L-shaped actuation lever, said actuation lever having a second slot located at one end and is pivotally connected to an outer surface of the wedge-shaped plate via a pivot pin at the opposite end; and the L-shaped design of the actuation lever allows the actuation lever to be pivotally connected to the outer surface of the wedge-shaped plate and allows the actuation lever to be horizontally aligned with a rear surface of the wedge-shaped plate and avoids interference with the rope and pulley system of the tree pruner, and further wherein, said second slot is also horizontally aligned with said lever arm which is pivotally connected to a rear surface of said cutting head and can receive said lever arm on its underside in a semi-interference type fit so that when said lever arm is pulled downward and actuated via said rope and pulley system, said actuation lever is forced downward by said lever arm and follows said lever arm in a parallel type manner.

4. The improvement for a tree pruner of claim 3, wherein said actuation means is further comprised of:

a plunger, said plunger being of a a linearly elongated vertically extending cylindrical configuration having a first end and a second end;

a pivot pin, said pivot pin for pivotally connecting said plunger to the first end of said actuation lever at such an angle to allow a second end of said plunger to come into mechanical communication with the depressable nipple of the aerosol sealant; and wherein the second end of said plunger is specially formed to have a wide flat surface to provide a solid surface for engaging the depressable nipple of the aerosol sealant;

a guide hoop, said guide hoop for guiding said plunger in the proper alignment to depressable nipple and being attached to the outer surface of wedge-shaped plate; and a spring, said spring encasing said plunger and for biasing said plunger upward against said actuation lever that said plunger is normally not applying pressure to said depressable nipple of the aerosol sealant.

* * * * *